US008417666B2

(12) United States Patent
Bailor et al.

(10) Patent No.: US 8,417,666 B2
(45) Date of Patent: Apr. 9, 2013

(54) STRUCTURED COAUTHORING (75) Inventors: Jonathan B. Bailor, Bellevue, WA (US);
Mark R. Knight, Bellevue, WA (US);
Andrew R. Simonds, New Castle, WA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 12/145,536

(22) Filed: Jun. 25, 2008

(65) Prior Publication Data

US 2009/0327294 A1 Dec. 31, 2009

(51) Int. Cl.
*G06F 7/00* (2006.01)
*G06F 17/00* (2006.01)
*G06F 3/00* (2006.01)

(52) U.S. Cl.
USPC ............ 707/608; 707/695; 707/785; 715/741

(58) Field of Classification Search .................. 707/608, 707/785, 786, 695, 702; 715/741
See application file for complete search history.

(56) References Cited

U.S. PATENT DOCUMENTS

| | | |
|---|---|---|
| 4,855,580 A | 8/1989 | Van Maanen, Jr. |
| 5,107,443 A | 4/1992 | Smith et al. |
| 5,142,619 A | 8/1992 | Webster, III |
| 5,313,394 A | 5/1994 | Clapp |
| 5,339,389 A | 8/1994 | Bates et al. |
| 5,446,842 A | 8/1995 | Schaeffer |
| 5,486,686 A | 1/1996 | Zdybel |
| 5,535,332 A | 7/1996 | Ishida |
| 5,568,640 A | 10/1996 | Nishiyama et al. |
| 5,623,659 A | 4/1997 | Shi et al. |
| 5,630,138 A | 5/1997 | Raman |
| 5,664,186 A | 9/1997 | Bennett et al. |
| 5,671,428 A | 9/1997 | Muranaga et al. |
| 5,692,178 A | 11/1997 | Shaughnessy |
| 5,729,734 A * | 3/1998 | Parker et al. .................... 1/1 |
| 5,751,958 A | 5/1998 | Zweben |
| 5,781,732 A | 7/1998 | Adams |

(Continued)

FOREIGN PATENT DOCUMENTS

| | | |
|---|---|---|
| CN | 1276568 A | 12/2000 |
| CN | 1804836 | 7/2006 |

(Continued)

OTHER PUBLICATIONS

International Search Report and Written Opinion for PCT/US2008/081456 / MS 321449.02 mailed Mar. 31, 2009.

(Continued)

*Primary Examiner* — James E Richardson
(74) *Attorney, Agent, or Firm* — Merchant & Gould (57) ABSTRACT

A system is presented for structured coauthoring of a document, the system comprising a server. The server includes one or more documents organized into sections, a document permissions module that stores user access permissions for each section of a document, a document update processing module that processes requests from a user to share document updates with other users and that processes requests from a user to receive document updates from other users and a document rendering module that renders a document for display on a client so that sections of the document are updated with shared document updates made by users. The user access permissions determine the extent to which a user can modify each section of the document.

20 Claims, 7 Drawing Sheets

U.S. PATENT DOCUMENTS

| | | | |
|---|---|---|---|
| 5,781,908 A | 7/1998 | Williams et al. | |
| 5,787,262 A | 7/1998 | Shakib et al. | |
| 5,835,950 A | 11/1998 | Cho et al. | |
| 5,963,931 A | 10/1999 | Fagg | |
| 6,000,945 A | 12/1999 | Sanchez-Lazer | |
| 6,006,239 A | 12/1999 | Bhansali et al. | |
| 6,026,461 A | 2/2000 | Baxter et al. | |
| 6,055,546 A | 4/2000 | Pongracz et al. | |
| 6,065,026 A | 5/2000 | Cornelia et al. | |
| 6,067,551 A | 5/2000 | Brown et al. | |
| 6,073,161 A | 6/2000 | DeBoskey et al. | |
| 6,088,702 A | 7/2000 | Plantz | |
| 6,202,085 B1 | 3/2001 | Benson et al. | |
| 6,209,010 B1 | 3/2001 | Gauthier | |
| 6,209,128 B1 | 3/2001 | Gerard et al. | |
| 6,240,414 B1 | 5/2001 | Beizer et al. | |
| 6,244,575 B1 | 6/2001 | Vaartstra et al. | |
| 6,275,935 B1 | 8/2001 | Barlow | |
| 6,317,777 B1 | 11/2001 | Skarbo et al. | |
| 6,324,544 B1 | 11/2001 | Alam et al. | |
| 6,327,584 B1 | 12/2001 | Xian et al. | |
| 6,327,611 B1 * | 12/2001 | Everingham | 709/206 |
| 6,341,291 B1 | 1/2002 | Bentley et al. | |
| 6,342,906 B1 | 1/2002 | Kumar et al. | |
| 6,363,352 B1 | 3/2002 | Dailey | |
| 6,411,965 B2 | 6/2002 | Klug | |
| 6,430,576 B1 | 8/2002 | Gates et al. | |
| 6,438,548 B1 | 8/2002 | Grim, III et al. | |
| 6,438,563 B1 | 8/2002 | Kawagoe | |
| 6,438,564 B1 | 8/2002 | Morton et al. | |
| 6,446,093 B2 | 9/2002 | Tabuchi | |
| 6,502,113 B1 | 12/2002 | Crawford et al. | |
| 6,526,434 B1 | 2/2003 | Carlson et al. | |
| 6,529,905 B1 | 3/2003 | Bray et al. | |
| 6,560,614 B1 | 5/2003 | Barboy et al. | |
| 6,560,620 B1 | 5/2003 | Ching | |
| 6,574,377 B1 | 6/2003 | Cahill | |
| 6,610,104 B1 | 8/2003 | Lin | |
| 6,662,209 B2 | 12/2003 | Potts, Jr. et al. | |
| 6,681,371 B1 | 1/2004 | Devanbu | |
| 6,681,382 B1 | 1/2004 | Kakumani | |
| 6,687,878 B1 | 2/2004 | Eintracht et al. | |
| 6,711,718 B2 | 3/2004 | Pfeil et al. | |
| 6,751,618 B1 | 6/2004 | Germscheid et al. | |
| 6,757,678 B2 | 6/2004 | Myllymaki | |
| 6,757,696 B2 | 6/2004 | Multer et al. | |
| 6,757,767 B1 | 6/2004 | Kelleher | |
| 6,757,871 B1 | 6/2004 | Sato et al. | |
| 6,760,840 B1 | 7/2004 | Shimbo et al. | |
| 6,772,165 B2 | 8/2004 | O'Carroll | |
| 6,842,768 B1 | 1/2005 | Shaffer et al. | |
| 6,854,087 B1 | 2/2005 | Takeo et al. | |
| 6,925,476 B1 | 8/2005 | Multer | |
| 6,976,213 B1 | 12/2005 | Letourneau et al. | |
| 6,983,416 B1 | 1/2006 | Bae | |
| 6,993,522 B2 | 1/2006 | Chen et al. | |
| 7,007,235 B1 | 2/2006 | Hussein et al. | |
| 7,024,429 B2 | 4/2006 | Ngo et al. | |
| 7,024,430 B1 | 4/2006 | Ingraham et al. | |
| 7,035,839 B2 | 4/2006 | Gillespie et al. | |
| 7,039,679 B2 | 5/2006 | Mendez et al. | |
| 7,047,407 B2 | 5/2006 | Itoh et al. | |
| 7,053,839 B2 | 5/2006 | Cassel et al. | |
| 7,058,663 B2 | 6/2006 | Johnson et al. | |
| 7,065,633 B1 | 6/2006 | Yates et al. | |
| 7,069,505 B2 | 6/2006 | Tamano | |
| 7,089,278 B1 | 8/2006 | Churchill et al. | |
| 7,110,936 B2 | 9/2006 | Hiew | |
| 7,111,237 B2 | 9/2006 | Chan | |
| 7,117,278 B2 | 10/2006 | Avery | |
| 7,124,151 B1 | 10/2006 | Choi | |
| 7,124,362 B2 | 10/2006 | Tischer | |
| 7,127,501 B1 | 10/2006 | Beir et al. | |
| 7,149,776 B1 | 12/2006 | Roy et al. | |
| 7,155,465 B2 | 12/2006 | Lee et al. | |
| 7,185,277 B1 | 2/2007 | Bernstein et al. | |
| 7,200,668 B2 | 4/2007 | Mak | |
| 7,203,708 B2 | 4/2007 | Liu et al. | |
| 7,209,948 B2 | 4/2007 | Srinivasa | |
| 7,225,189 B1 | 5/2007 | McCormack et al. | |
| 7,240,091 B1 | 7/2007 | Hopmann et al. | |
| 7,249,314 B2 | 7/2007 | Walker et al. | |
| 7,293,049 B2 | 11/2007 | Kadyk et al. | |
| 7,310,657 B2 | 12/2007 | Nakamura | |
| 7,315,978 B2 | 1/2008 | Giles et al. | |
| 7,328,243 B2 | 2/2008 | Yeager et al. | |
| 7,346,705 B2 | 3/2008 | Hullot et al. | |
| 7,401,291 B2 | 7/2008 | Ramaley et al. | |
| 7,496,577 B2 | 2/2009 | Williamson | |
| 7,529,780 B1 | 5/2009 | Braginsky et al. | |
| 7,536,641 B2 | 5/2009 | Rosenstein et al. | |
| 7,565,603 B1 | 7/2009 | Jones et al. | |
| 7,577,906 B2 | 8/2009 | Friedrichowitz | |
| 7,594,163 B2 | 9/2009 | Slack-Smith | |
| 7,603,357 B1 | 10/2009 | Gourdol | |
| 7,610,287 B1 | 10/2009 | Dean et al. | |
| 7,647,292 B2 | 1/2010 | Hayashi | |
| 7,650,336 B1 | 1/2010 | Herrmann | |
| 7,664,750 B2 | 2/2010 | Frees | |
| 7,694,217 B2 | 4/2010 | Croft | |
| 7,714,222 B2 | 5/2010 | Taub | |
| 7,761,784 B2 | 7/2010 | Parks et al. | |
| 7,779,347 B2 | 8/2010 | Christiansen et al. | |
| 7,788,326 B2 | 8/2010 | Buchheit et al. | |
| 7,792,788 B2 | 9/2010 | Melmon | |
| 7,801,951 B2 | 9/2010 | Fishkin et al. | |
| 7,839,532 B2 | 11/2010 | Brawn et al. | |
| 7,912,811 B2 | 3/2011 | Hodel-Widmer | |
| 7,941,399 B2 | 5/2011 | Bailor | |
| 7,962,853 B2 | 6/2011 | Bedi et al. | |
| 7,966,556 B1 | 6/2011 | Bourdev | |
| 8,019,780 B1 | 9/2011 | Pinkerton et al. | |
| 8,028,229 B2 | 9/2011 | Bailor et al. | |
| 8,082,277 B1 * | 12/2011 | O'Brien et al. | 707/802 |
| 2001/0018697 A1 | 8/2001 | Kunitake et al. | |
| 2001/0042075 A1 | 11/2001 | Tabuchi | |
| 2002/0007287 A1 | 1/2002 | Straube et al. | |
| 2002/0065848 A1 | 5/2002 | Walker et al. | |
| 2002/0069192 A1 | 6/2002 | Aegerter | |
| 2002/0188598 A1 | 12/2002 | Myllymaki | |
| 2003/0028600 A1 * | 2/2003 | Parker | 709/206 |
| 2003/0093760 A1 | 5/2003 | Suzuki et al. | |
| 2003/0097638 A1 | 5/2003 | Tamano | |
| 2003/0115481 A1 * | 6/2003 | Baird et al. | 713/201 |
| 2003/0140067 A1 * | 7/2003 | Sesek et al. | 707/203 |
| 2003/0159105 A1 | 8/2003 | Hiebert | |
| 2003/0167281 A1 | 9/2003 | Cohen et al. | |
| 2003/0172113 A1 | 9/2003 | Cameron et al. | |
| 2003/0172168 A1 | 9/2003 | Mak et al. | |
| 2003/0208534 A1 | 11/2003 | Carmichael | |
| 2004/0039829 A1 | 2/2004 | Bucher | |
| 2004/0068505 A1 | 4/2004 | Lee et al. | |
| 2004/0107224 A1 | 6/2004 | Bera | |
| 2004/0122870 A1 | 6/2004 | Park et al. | |
| 2004/0122898 A1 | 6/2004 | Srinivasa | |
| 2004/0122912 A1 | 6/2004 | Kim et al. | |
| 2004/0133858 A1 | 7/2004 | Barnett | |
| 2004/0143630 A1 | 7/2004 | Kaufmann et al. | |
| 2004/0172395 A1 | 9/2004 | Edelstein et al. | |
| 2004/0177343 A1 | 9/2004 | McVoy et al. | |
| 2004/0199550 A1 | 10/2004 | Ito et al. | |
| 2004/0205539 A1 | 10/2004 | Mak et al. | |
| 2004/0205653 A1 | 10/2004 | Hadfield et al. | |
| 2004/0230903 A1 | 11/2004 | Elza et al. | |
| 2004/0239700 A1 | 12/2004 | Baschy | |
| 2004/0243644 A1 | 12/2004 | Steere et al. | |
| 2005/0004990 A1 | 1/2005 | Durazo | |
| 2005/0022122 A1 * | 1/2005 | Barrus et al. | 715/530 |
| 2005/0033811 A1 | 2/2005 | Bhogal et al. | |
| 2005/0064858 A1 | 3/2005 | Makela et al. | |
| 2005/0071386 A1 | 3/2005 | Wolfgang | |
| 2005/0097440 A1 | 5/2005 | Lusk et al. | |
| 2005/0177617 A1 | 8/2005 | Banginwar et al. | |
| 2005/0198132 A1 * | 9/2005 | Vellante et al. | 709/204 |
| 2005/0203962 A1 | 9/2005 | Zhou et al. | |
| 2005/0210392 A1 | 9/2005 | Koide | |
| 2005/0216524 A1 | 9/2005 | Gomes et al. | |

| | | |
|---|---|---|
| 2005/0223066 A1 | 10/2005 | Buchheit et al. |
| 2005/0234943 A1 | 10/2005 | Clarke |
| 2005/0240858 A1 | 10/2005 | Croft et al. |
| 2005/0251738 A1 | 11/2005 | Hirano et al. |
| 2005/0256907 A1 | 11/2005 | Novik et al. |
| 2005/0262203 A1 | 11/2005 | Buchheit et al. |
| 2005/0289512 A1* | 12/2005 | Matsusaka .................... 717/120 |
| 2006/0015539 A1 | 1/2006 | Wolf et al. |
| 2006/0015811 A1 | 1/2006 | Tanaka et al. |
| 2006/0020360 A1 | 1/2006 | Wu |
| 2006/0031264 A1 | 2/2006 | Bosworth et al. |
| 2006/0041579 A1 | 2/2006 | Miyashita et al. |
| 2006/0041596 A1 | 2/2006 | Stirbu et al. |
| 2006/0047656 A1 | 3/2006 | Dehlinger et al. |
| 2006/0053194 A1 | 3/2006 | Schneider |
| 2006/0053195 A1 | 3/2006 | Schneider et al. |
| 2006/0080432 A1 | 4/2006 | Spataro et al. |
| 2006/0085402 A1 | 4/2006 | Brown et al. |
| 2006/0101328 A1 | 5/2006 | Albornoz |
| 2006/0106879 A1 | 5/2006 | Zondervan et al. |
| 2006/0123033 A1 | 6/2006 | Livshits |
| 2006/0136511 A1 | 6/2006 | Ngo |
| 2006/0136809 A1 | 6/2006 | Fernstrom |
| 2006/0200755 A1 | 9/2006 | Melmon et al. |
| 2006/0218476 A1 | 9/2006 | Gombert |
| 2006/0242549 A1 | 10/2006 | Schwier et al. |
| 2006/0248038 A1 | 11/2006 | Kaplan |
| 2006/0259524 A1 | 11/2006 | Horton |
| 2006/0265377 A1 | 11/2006 | Raman et al. |
| 2007/0016650 A1 | 1/2007 | Gilbert et al. |
| 2007/0066293 A1 | 3/2007 | Peng |
| 2007/0118598 A1 | 5/2007 | Bedi et al. |
| 2007/0118794 A1 | 5/2007 | Hollander et al. |
| 2007/0130334 A1 | 6/2007 | Carley |
| 2007/0156672 A1 | 7/2007 | Wolff et al. |
| 2007/0186157 A1 | 8/2007 | Walker et al. |
| 2007/0186171 A1 | 8/2007 | Junuzovic et al. |
| 2007/0198952 A1 | 8/2007 | Pittenger |
| 2007/0203917 A1 | 8/2007 | Du et al. |
| 2007/0226320 A1 | 9/2007 | Hager et al. |
| 2007/0226604 A1 | 9/2007 | Chalasani et al. |
| 2007/0271502 A1 | 11/2007 | Bedi et al. |
| 2007/0283321 A1 | 12/2007 | Hedge et al. |
| 2008/0028300 A1 | 1/2008 | Krieger et al. |
| 2008/0052634 A1 | 2/2008 | Fishkin et al. |
| 2008/0059187 A1 | 3/2008 | Roitblat et al. |
| 2008/0059539 A1* | 3/2008 | Chin et al. .................... 707/203 |
| 2008/0072141 A1 | 3/2008 | Hodel-Widmer |
| 2008/0086718 A1 | 4/2008 | Bostic |
| 2008/0097993 A1 | 4/2008 | Nanba |
| 2008/0098294 A1 | 4/2008 | Le |
| 2008/0114740 A1 | 5/2008 | Vergottini |
| 2008/0126953 A1 | 5/2008 | Davidson et al. |
| 2008/0147590 A1 | 6/2008 | Bechtel et al. |
| 2008/0177782 A1 | 7/2008 | Poston |
| 2008/0180740 A1 | 7/2008 | Kimura et al. |
| 2008/0195800 A1 | 8/2008 | Lee |
| 2008/0235579 A1 | 9/2008 | Champion et al. |
| 2008/0256113 A1 | 10/2008 | Rasmussen et al. |
| 2008/0256114 A1 | 10/2008 | Rasmussen et al. |
| 2008/0263032 A1 | 10/2008 | Vailaya et al. |
| 2008/0270386 A1 | 10/2008 | Ohi et al. |
| 2008/0294895 A1* | 11/2008 | Bodner et al. ................ 713/168 |
| 2008/0320384 A1 | 12/2008 | Nagarajan |
| 2009/0006936 A1 | 1/2009 | Parker |
| 2009/0006946 A1 | 1/2009 | Hanson |
| 2009/0006948 A1 | 1/2009 | Parker |
| 2009/0063489 A1 | 3/2009 | Neumann |
| 2009/0094231 A1 | 4/2009 | Marvit et al. |
| 2009/0094242 A1 | 4/2009 | Lo et al. |
| 2009/0125518 A1 | 5/2009 | Bailor et al. |
| 2009/0157811 A1 | 6/2009 | Bailor et al. |
| 2009/0171987 A1 | 7/2009 | Coppinger et al. |
| 2009/0193331 A1 | 7/2009 | Croft et al. |
| 2009/0228473 A1 | 9/2009 | Kannan et al. |
| 2009/0235158 A1 | 9/2009 | Rosenstein et al. |
| 2009/0249224 A1 | 10/2009 | Davis et al. |
| 2009/0271696 A1 | 10/2009 | Bailor et al. |
| 2009/0282041 A1 | 11/2009 | Skaria et al. |
| 2009/0282462 A1 | 11/2009 | Skaria |
| 2010/0023562 A1 | 1/2010 | Kreuch et al. |
| 2010/0070464 A1 | 3/2010 | Aymeloglu et al. |
| 2010/0088676 A1 | 4/2010 | Yuan |
| 2010/0095198 A1 | 4/2010 | Bultrowicz et al. |
| 2010/0131836 A1 | 5/2010 | Dukhon et al. |
| 2010/0278453 A1 | 11/2010 | King |
| 2010/0281074 A1 | 11/2010 | Bailor et al. |
| 2011/0055702 A1 | 3/2011 | Jakobson |
| 2011/0184906 A1 | 7/2011 | Bailor et al. |
| 2012/0254315 A1 | 10/2012 | Skaria et al. |
| 2012/0278276 A1 | 11/2012 | Bailor et al. |
| 2013/0013997 A1 | 1/2013 | Bailor et al. |

FOREIGN PATENT DOCUMENTS

| | | |
|---|---|---|
| CN | 101042702 | 9/2007 |
| DE | 19844071 A1 | 4/1999 |
| EP | 1132847 A2 | 9/2001 |
| EP | 1290575 B1 | 6/2005 |
| EP | 1681652 A2 | 7/2006 |
| JP | 2005310158 A | 11/2005 |
| KR | 10-0331685 | 4/2002 |
| KR | 10-2006-0047218 A | 5/2006 |
| RU | 2250492 C2 | 4/2005 |
| RU | 50695 U1 | 1/2006 |
| TW | 200424868 A | 11/2004 |
| TW | 200627259 A | 8/2006 |
| WO | WO 01/25986 | 4/2001 |
| WO | WO 01/33362 A1 | 5/2001 |
| WO | WO 01/88750 | 11/2001 |
| WO | WO 02/33575 | 4/2002 |
| WO | WO 03/058374 | 7/2003 |
| WO | WO 2005/114467 A2 | 12/2005 |
| WO | WO 2007/034858 A1 | 3/2007 |
| WO | WO 2007/062949 | 6/2007 |
| WO | WO 2009/061638 | 5/2009 |
| WO | WO 2009/076010 | 6/2009 |
| WO | WO 2009/079116 | 6/2009 |
| WO | WO 2009/134548 | 11/2009 |
| WO | WO 2009/154842 | 12/2009 |
| WO | WO 2009/158108 | 12/2009 |

OTHER PUBLICATIONS

US Office Action (Non-Final) for U.S. Appl. No. 11/938,082, mailed Dec. 28, 2009.
Adkins et al.; GSS Collaboration in Document Development: Using Group Writer to Improve the Process, Proceedings of the 32nd Hawaii International Conference on System Sciences, Copyright © 1999 IEEE, 11 pages.
International Search Report and Written Opinion for PCT/US2009/039316, mailed Jan. 18, 2010, 11 pages.
Synchronous Collaborative Text Document Editing Online: MoonEdit, reviewed Sep. 13, 2007, pp. 104, http://www.masternewmedia.org/news/2005/02/20/synchronous_collaborative_text_document-editing.htm.
US Office Action (Non-Final) for U.S. Appl. No. 11/957,010, mailed Mar. 18, 2010, 32 pages.
Google, "Share and Collaborate in Real Time," 2008, 1 page, http://www.google.com/google-d-s/intl/en/tour2.html.
Haake et al., "Collaborative Authoring of Hypermedia Documents," 1993, pp. 41-58, http://www/pi6.fernuni-hagen.de/publ/MT-93.pdf.
Masternewmedia; "Synchronous Collaborative Text Document Editing," Feb. 20, 2005, 1 page, http://www.masternewmedia.org/news/2005/02/20/synchronous_collaborative_text_document_editing.htm.
McKechan et al., "Design Considerations for Creditor: A Collaborative Report Writing Editor," 10 pages, accessed May 16, 2008, http://userpages.umbc.edu/~jcampbel/Group01/McKechan_paper_iwces3.pdf.
Adler et al., "Evaluating and Implementing a Collaborative Office Document System," 2005, pp. 1-18, http://www.sce.carleton.ca/faculty/adler/publications/2005/adler-nash-noel-2005-Collab-Office.pdf.
Citro et al., "Conflict Management for Real-Time Collaborative Editing in Mobile Replicated Architectures," School of Computer Science and Information Technology, RMIT University, Melbourne, Victoria, Australia, Australian Computer Society, Inc. © 2007, pp. 1-10, http://www.crpit.com/confpapers/CRPITV62Citro.pdf.

"Codeville," http://codeville.org/, 2 pages (Date Retrieved Oct. 9, 2007).

"File Locks-GNU Emacs Lisp Reference Manual"; www.gnu.org/software/emacs/elisp/html_node/File-Locks.html; Mar. 28, 2006; 2 pages.

Galli, R., "Journal File Systems in Linux," http://bulma.net/impresion.phtml?nIdNoticia=1154, 15 pages (Jan. 24, 2002).

"Google, Google Docs & Spreadsheets Tour" downloaded from http://www.google.com/google-d-s/intl/en/tour2.html on Nov. 9, 2007 (1 page).

Green, Bob, "Converting Qedit to the Client/Server Model", http://www.robelle.com/library/papers/client-server/, 14 pages (Copyright 2004).

Hebsgarrd, Poul J; Process Driven Document Management®, Version 6.1, Feb. 2007, pp. 1-13, http://www.brain-technology.com/upload/file_vk306c6tr779p9gntgho_16467.pdf.

Ignat et al., "Extending Real-Time Collaborative Editing Systems with Asynchronous Communication," Institute for Information Systems, ETH Zurich, (at least as early as Oct. 4, 2007) pp. 1-6, http://www.inf.ethz.ch/personal/ignat/Publications/cscwd_04.pdf.

Koch, Michael, "Design Issues and Model for a Distributed Multi-User Editor" (pp. 1-21), from *Computer Supported Cooperative Work, An International Journal*, 3(3-4), 19995, pp. 359-378.

La Fontaine, Robin, Monsell EDM Ltd., Merging XMLFiles: a new approach providing intelligent merge of XML data sets, Presented at XML Europe 2002, 21 pages, http://www.deltaxml.com/dxml/93/version/default/part/AttachmentData/data/merging-xml-files.pdf.

Microsoft Corporation, Compare and Merge Mechanisms, © 2007, 1 page, http://msdn2.microsoft.com/en-us/library/ek8hk7e2(VS.80,d=printer).aspx.

Miller et al.; "Interactive Simultaneous Editing of Multiple Text Regions"; www.co-ode.org/resources/papers/k-cap2007-seidenberg.pdf; Jun. 2001; 15 pages.

Pacull et al., "Duplex: A Distributed Collaborative Editing Environment in Large Scale" *Proceedings of the Conference on Computer Supported Cooperative Work*, Oct. 22-26, 1994, Chapel Hill, NC, USA. ACM, 1994; pp. 165-173.

Preston et al., "Synchronous Editing via Web Services: Combining Heterogeneous Client and Server Technologies," Department of Computer Science, Georgia State University, Atlanta, Georgia, *CSCW 2006*, Nov. 4-8, 2006, Banff, Alberta, Canada, pp. 1-2. http://cims.clayton.edu/jpreston/PhD/Research/Preston%20-%20CSCW%20Demo%20Extended%20Abstract.pdf.

Seidenberg et al; "A Methodology for Asynchronous MultiUser Editing of Semantic Web Ontologies"; www.xmpp.org/extensions/xep-0058.html; Mar. 28, 2006; 8 pages.

Shchepin; "XEP-0058: Multi-User Text Editing"; http://groups.csail.mitedu/uid/projects/simuledit/usenix01.pdf; Oct. 9, 2007; 5 pages.

"Status of Software Reuse 577," http://www.plex86.org/Computer_Folklore/Status-of-Software-Reuse-577.html, 2 pages (Date Retrieved Oct. 9, 2007).

Tichy, Walter F., RCS—A System for Version Control, Jan. 3, 1991, 20 pages, http://www.svlug.org/teams/rcs.pdf.

U.S. Appl. No. 11/938,082, filed Nov. 9, 2007, Confirmation No. 3133.

U.S. Appl. No. 11/951,973, filed Dec. 6, 2007, Confirmation No. 9364.

U.S. Appl. No. 11/957,010, filed Dec. 14, 2007, Confirmation No. 8535.

U.S. Appl. No. 12/044,744, filed Mar. 7, 2008, Confirmation No. 7862.

U.S. Appl. No. 12/111,174, filed Apr. 28, 2008, Confirmation No. 6839.

U.S. Appl. No. 12/117,025, filed May 8, 2008, Confirmation No. 8234.

U.S. Appl. No. 12/117,040, filed May 8, 2008, Confirmation No. 8262.

Wilde, Erik, "Multi-User Multimedia Editing with the MultimETH System," Swiss Federal Institute of Technology, CH 8092, Zurich, (at least as early as Oct. 10, 2007) pp. 1-9, http://dret.net/netdret/docs/wilde-tikrep18.pdf.

US Final Office Action for U.S. Appl. No. 11/938,082 mailed Jun. 29, 2010.

US Non-Final Office Action for U.S. Appl. No. 12/044,744 mailed Jul. 26, 2010.

US Final Office Action for U.S. Appl. No. 11/957,010 mailed Aug. 18, 2010.

US Final Office Action for U.S. Appl. No. 12/117,025 mailed Sep. 21, 2010.

International Preliminary Report and Written Opinion for PCT/US2008/083069, mailed May 29, 2009; 3 pages.

International Search Report and Written Opinion for PCT/US2009/037920, mailed Nov. 30, 2009, 11 pages.

International Search Report and Written Opinion for PCT/US2009/045558, mailed Nov. 30, 2009, 11 pages.

Ohst et al., "Difference Tools for Analysis and Design Documents," IEEE 2003; pp. 1-10.

Lu et al., "Merging Retrieval Results in Hierarchical Peer-to-Peer Networks," SIGIR '04, Jul. 25-29, 2004, Sheffield, South Yorkshire, UK, ACM 1-58113-881-4/04/0007; pp. 472-473.

Heckel, "A Technique for Isolating Differences Between Files," ACM 1978; pp. 264-268.

USPTO Notice of Allowance cited in U.S. Appl. No. 11/938,082, mailed Jan. 4, 2010; 17 pages.

USPTO Final Office Action cited in U.S. Appl. No. 12/044,744, dated Nov. 22, 2010 ; 14 pages.

USPTO Non-Final Office Action cited in U.S. Appl. No. 12/117,025, dated Sep. 21, 2010; 12 pages.

USPTO Non-Final Office Action cited in U.S. Appl. No. 11/951,973, dated Jan. 19, 2011; 9 pages.

Chinese Office Action in Application 200880119647.9, mailed Nov. 24, 2011, 7 pgs.

US Notice of Allowance for U.S. Appl. No. 12/117,025, mailed Dec. 28, 2011, 11 pgs.

U.S. Appl. No. 13/079,605, Office Action mailed Dec. 5, 2011, 31 pgs.

U.S. Appl. No. 12/044,744, Office Action mailed Dec. 30, 2011, 17 pgs.

U.S. Appl. No. 11/957,010, Office Action mailed Jan. 27, 2012, 25 pgs.

U.S. Appl. No. 12/117,040, Amendment and Response filed Jan. 4, 2012, 12 pgs.

U.S. Appl. No. 12/276,874, Amendment and Response filed Jan. 26, 2012, 13 pgs.

Chinese 1st Office Action in Application 200880121295.0, mailed Jan. 18, 2012, 6 pgs.

U.S. Appl. No. 12/111,174, Amendment and Response filed Feb. 21, 2012, 9 pgs.

US Notice of Allowance for U.S. Appl. No. 12/117,025, mailed Apr. 14, 2011, 10 pgs.

U.S. Appl. No. 12/117,025, Amendment and Response filed Dec. 21, 2010, 17 pgs.

U.S. Appl. No. 12/117,025, Notice of Allowance mailed Jul. 21, 2011, 10 pgs.

U.S. Appl. No. 11/938,082, Amendment and Response filed Mar. 25, 2010, 15 pgs.

U.S. Appl. No. 11/938,082, Amendment and Response filed Aug. 4, 2010, 14 pgs.

U.S. Appl. No. 11/951,973, Amendment and Response filed Apr. 13, 2011, 11 pgs.

U.S. Appl. No. 11/957,010, Amendment and Response filed Jun. 2, 2010, 12 pgs.

U.S. Appl. No. 11/957,010, Amendment and Response filed Nov. 17, 2010, 11 pgs.

U.S. Appl. No. 12/044,744, Amendment and Response filed 10/26// 2010, 11 pgs.

U.S. Appl. No. 12/044,744, Amendment and Response filed Dec. 2, 2011, 11 pgs.

U.S. Appl. No. 12/044,744, Amendment and Response filed Jun. 24, 2011, 11 pgs.

Appleton, Brad, "ClearView: Associating Attributes and Notes With a View", ClearCase International User's Group Conference, Sep. 1996, 16 pgs.
Bellagio, David et al., "Software Configuration Management Strategies and IBM Rational ClearCase a Practical Introduction, Second Edition" In: "Software Configuration Management Strategies and IBM Rational ClearCase a Practical Introduction, Second Edition", May 23, 2005, IBM Press, XP55009093, ISBN: 978-0-32-120019-8 pp. 173-178.
Byfield, Bruce, "Ooo Off The Wall: That's Your Version—Document Control in Ooo Writer", published on Linux Journal, Mar. 7, 2006, 6 pgs.
Chinese Office Action in Application 200880115943.1, mailed Oct. 25, 2011, 13 pgs.
European Extended Search Report in EP Application 09739350.8, mailed Nov. 9, 2011, 10 pgs.
Immedius, Inc., "S1000Dmanager v 3.0", Comprehensive S1000D Project Setup and Management Support, found online on Aug. 22, 2008 at: http://www.immediuss1000d.com/c_manager/S1Dmanager_overview.html, 6 pgs.
International Search Report for PCT/US2009/062364 dated May 31, 2010, 11 pgs.
Samiei et al., "EzMail: Using Information Vizualization Techniques to Help Manage Email", Proceedings of the 8th National Conference on Information Vizualization, 2004, 6 pgs.
U.S. Appl. No. 11/951,973, Notice of Allowance mailed Jun. 21, 2011, 9 pgs.
U.S. Appl. No. 11/957,010, Office Action mailed Aug. 17, 2011, 26 pgs.
U.S. Appl. No. 12/044,744, Final Office Action mailed Aug. 30, 2011, 17 pgs.
U.S. Appl. No. 12/111,174, Amendment and Response mailed Sep. 8, 2011, 11 pgs.
U.S. Appl. No. 12/117,025, Notice of Allowance mailed Sep. 15, 2011, 9 pgs.
U.S. Appl. No. 12/117,040, Office Action mailed Oct. 4, 2011, 15 pgs.
U.S. Appl. No. 12/276,874, Amendment and Response filed Jun. 22, 2011, 17 pgs.
U.S. Appl. No. 12/276,874, Final Office Action mailed Aug. 3, 2011, 15 pgs.
U.S. Appl. No. 12/276,874, Office Action mailed Feb. 22, 2011, 15 pgs.
U.S. Appl. No. 12/111,174, Office Action mailed Nov. 21, 2011, 20 pgs.
U.S. Appl. No. 12/276,874, Office Action mailed Oct. 26, 2011, 18 pgs.
U.S. Appl. No. 11/957,010, Amendment and Response filed Nov. 16, 2011, 12 pgs.
U.S. Appl. No. 12/044,744, Amendment and Response filed Nov. 30, 2011, 12 pgs.
Venolia, Gina et al., "Understanding Sequence and Reply Relationships Within Email Conversations: A Mixed-Model Vizualization", Apr. 2003, Proceedings of the SIGCHI Conference on Human Factors in Computing Systems, Ft. Lauderdale, FL, USA, Apr. 5-10, 2003, 8 pgs.
Williams, Tim, "Version Control on the Cheap: A User-Friendly, Cost-Effective Revision Control System for SAS", 10 pgs., no date.
Zend Corporation, the PHP Company, "Team Development With Zend Studio for Eclipse", White Paper, Jan. 2008, 17 pgs.
Chinese 1st Office Action in Application 200980124935.8, mailed Oct. 30, 2012, 10 pgs.
"Perforce software Delivers Improved Performance to its Fast Software Configuration Management System," Perforce Software, Jul. 9, 2007, 2 pages.
"Technical Overview," Apache CouchDB, The Apache Software Foundation, © 2008, 7 pages.
Australian Office Action in Application 2008324973, mailed Jul. 4, 2012, 3 pgs.
Badouel, Eric et al., "Merging Hierarchically-Structured Documents in Workflow Systems", Electronic Notes in Theoretical Computer Science 203, (2008), 3-24.
Chinese 1st Office Action in Application 200980115758.7, mailed Mar. 28, 2012, 10 pgs.
Dekeyser, Stijin, et al., "Path Locks for XML Document Collaboration", University of Antwerp, Dec. 12, 2002, pp. 105-114.
Ellis et al., "Groupware—Some Issues and Experiences", vol. 34, No. 1, Jan. 1, 1991, pp. 38-58.
Feise, Joachim; "A Survey of Distributed Hypermedia Systems," ISR Institute for Software Research, University of California, Irvine, Apr. 2005, 39 pages.
Grover, Chris, "Word 2007:The Missing Manual", Pogue Press, Copyright 2007, pp. 380-388.
"How to Track and Manage Changes in a Word 2002 and a Word 2003 Document," Microsoft Corporation, Mar. 8, 2007, 4 pages.
Jalbert, Peter, "Real Time Collaboration with Google Docs and Spreadsheets," Jan. 23, 2008, 5 pages.
Mendoza et al., "A Flexible Distribution Service for a Co-authoring Environment on the Web," IEEE Computer Society, Proceedings of Sixth Mexican International Conference on Computer Science (ENC '05) © 2005, 8 pages.
Murray, Katherine et al., "Compare and Combine Documents in Word 2007", Microsoft Office Word 2007 Inside Out, obtained online on Jul. 11, 2012 at: http://office.microsoft.com/en-us/word-help/compare-and-combine-documents-in-word-2..., 2012 Microsoft Corporation, 5 pgs.
PCT International Search Report and Written Opinion in Application PCT/US2010/032309, mailed Dec. 1, 2010, 9 pgs.
Russian Notice of Allowance in Application 2010123793, mailed Apr. 13, 2012, 7 pgs.
Shepler et al., "Network File 1-15 Systems (NFS)," Version 4, Apr. 1, 2003, retrieved from http://rsync.tools.ietf.org/html/rfc3530 on Mar. 7, 2012, 275 pgs.
Shiro Sakata, "Development and Evaluation on an in-house multimedia desktop conference system", Apr. 1990, IEEE Journal on selected areas in communications, vol. 8.
Taiwan Search Report and Office Action in Application 97142418, mailed Feb. 21, 2012, 13 pgs.
"Track Changes in Word 2007 Tutorial," Florida Gulf Coast University, copyright 2007, 2 pages.
Tyson, Herb, "Microsoft Word 2007 Bible", Wiley Publishing Company, Inc. 2007, Indianapolis, IN, USA, pp. 807-808.
U.S. Appl. No. 11/957,010, Amendment and Response filed Apr. 9, 2012, 12 pgs.
U.S. Appl. No. 12/044,744, Notice of Allowance mailed May 7, 2012, 12 pgs.
U.S. Appl. No. 12/111,174, Notice of Allowance mailed Apr. 12, 2012, 11 pgs.
U.S. Appl. No. 12/117,040, Notice of Allowance mailed Mar. 29, 2012, 11 pgs.
U.S. Appl. No. 12/276,874, Office Action mailed Apr. 26, 2012, 20 pgs.
U.S. Appl. No. 12/432,817, Amendment and Response filed Dec. 12, 2011, 15 pgs.
U.S. Appl. No. 12/432,817, Amendment and Response filed Apr. 25, 2012, 11 pgs.
U.S. Appl. No. 12/432,817, Notice of Allowance mailed May 2, 2012, 6 pgs.
U.S. Appl. No. 12/432,817, Office Action mailed Jan. 25, 2012, 27 pgs.
U.S. Appl. No. 12/432,817, Office Action mailed Sep. 12, 2011, 25 pgs.
U.S. Appl. No. 12/432,817, Notice of Allowance mailed Aug. 6, 2012, 5 pgs.
U.S. Appl. No. 13/079,605, Amendment and Response filed Feb. 28, 2012, 12 pgs.
U.S. Appl. No. 13/079,605, Notice of Allowance mailed Apr. 20, 2012, 9 pgs.
U.S. Appl. No. 12/044,744, Amendment and Response filed Mar. 30, 2012, 11 pgs.
U.S. Appl. No. 12/044,744, Notice of Allowance mailed Jun. 21, 2012, 8 pgs.
U.S. Appl. No. 13/079,605, Notice of Allowance mailed Jun. 28, 2012, 9 pgs.

U.S. Appl. No. 12/117,040, Notice of Allowance mailed Jun. 21, 2012, 9 pgs.
Willden, Andrew, "Track Changes in Word 2007," Fall 2007, 2 pages.
U.S. Appl. No. 12/117,040, Notice of Allowance mailed Aug. 20, 2012, 14 pgs.
Chinese 1st Office Action in Application 201080019470.2, mailed Aug. 31, 2012, 8 pgs.
U.S. Appl. No. 12/111,174, Notice of Allowance mailed Aug. 29, 2012, 11 pgs.
Australian Notice of Acceptance in Application 2008324973, mailed Aug. 22, 2012, 3 pgs.
Chinese 3rd Office Action in Application 200880115943.1, mailed Aug. 30, 2012, 6 pgs.
Taiwanese Notice of Allowance in Application 97142418, mailed Aug. 16, 2012, 4 pgs.
Australian Office Action in Application 2008335565, mailed Aug. 30, 2012, 3 pgs.
Chinese 2nd Office Action in Application 200880119647.9, mailed Aug. 13, 2012, 6 pgs.
U.S. Appl. No. 12/276,874, Office Action mailed Sep. 27, 2012, 22 pgs.
U.S. Appl. No. 13/079,605, Notice of Allowance mailed Oct. 22, 2012, 9 pgs.
U.S. Appl. No. 13/539,473, Office Action mailed Oct. 11, 2012, 23 pgs.
U.S. Appl. No. 12/117,025, Office Action mailed Oct. 31, 2012, 11 pgs.
Chinese 2nd Office Action in Application 200880121295.0, mailed Oct. 23, 2012, 10 pgs.
Chinese 1st Office Action in Application 200980116872.1, mailed Oct. 9, 2012, 14 pgs.
Australian Notice of Acceptance in Application 200835565, mailed Sep. 18, 2012, 3 pgs.
European Examination Report in Application 09739350.8, mailed Sep. 25, 2012, 7 pgs.
Chinese 2nd Office Action in Application 200880115943.01, mailed Jun. 1, 2012, 7 pages.
European Extended Search Report in EP Application 09767155.6, mailed Mar. 26, 2012, 10 pages.
Tanenbaum, Andrew S., "Moderne Betriebssysteme", 2003 Pearson, pp. 786-787 [with corresponding English pp. 735-737].
U.S. Appl. No. 12/111,174, Notice of Allowance mailed Nov. 19, 2012, 2 pgs.
U.S. Appl. No. 13/079,605, Notice of Allowance mailed Nov. 19, 2012, 2 pgs.
U.S. Appl. No. 13/495,659, Office Action mailed Nov. 21, 2012, 7 pgs.
U.S. Appl. No. 12/117,040, Notice of Allowance mailed Dec. 6, 2012, 14 pgs.
U.S. Appl. No. 13/079,605, Notice of Allowance mailed Dec. 5, 2012, 2 pgs.
U.S. Appl. No. 12/111,174, Notice of Allowance mailed Dec. 4, 2012, 2 pgs.
Russian Notice of Allowance in Application 2010122968, mailed Nov. 6, 2012, 27 pgs.
Australian Office Action in Application 2008338826, mailed Oct. 24, 2012, 3 pgs.
Chinese 2nd Office Action in Application 200980115758.7, mailed Dec. 5, 2012, 7 pgs.
Chinese 1st Office Action in Application 200980147769.3, mailed Nov. 29, 2012, 12 pgs.
U.S. Appl. No. 13/539,473, Amendment and Response filed Jan. 11, 2013, 15 pgs.
U.S. Appl. No. 12/276,874, Amendment and Response filed Dec. 27, 2012, 14 pgs.
Australian Notice of Allowance in Application 2008338826, mailed Dec. 5, 2012, 2 pgs.
U.S. Appl. No. 12/117,025, Amendment and Response filed Jan. 30, 2013, 13 pgs.

* cited by examiner

404 — Tom Anderson

406 — Sales for the North American region in the first quarter increased by 22% over the same quarter last year. This was achieved in spite of a slow-down in the general economy. Great job! Keep up the fantastic effort.

306 — Sales for the North American region in the first quarter increased by 22% over the same quarter last year. This was achieved in spite of a slow-down in the general economy. The sales force is to be congratulated for this achievement.

322

312 — Heidi Craig  318 
314 — Tom Anderson  320

STRUCTURED COAUTHORING

BACKGROUND

In multi-user environments, it may be desirable for multiple users be able to edit the same document at the same time. Often, when multiple users are editing the document, confusion can exist as to how the various edits are added to the document. For example, sometimes multiple versions of the document are edited, making it difficult to merge the edits into a single, complete document.

Even in systems that support multi-user editing of a document, users typically cannot control when the users' edits are shown to others editing the document. Further, it can be difficult to define which user is working on which particular part of the document, thereby resulting in possible conflicts in the changes made to the document.

SUMMARY

The present disclosure relates to systems and methods for structured coauthoring of a document.

According to one aspect, a system for structured coauthoring of a document comprises a server including one or more documents, each document being organized into sections, a document permissions module that stores user access permissions for each section of a document, a document update processing module that processes requests from a user to share document updates with other users and that processes requests from a user to receive document updates from other users and a document rendering module that renders a document for display on a client, the document being rendered so that sections of the document are updated with shared document updates made by users, the shared document updates being requested by the user on the client. The user access permissions determine the extent to which a user can modify each section of the document, permitting different user access permissions to be stored for one or more sections of the document. The system permits two or more users to coauthor one or more of the sections of the document so that each user has specific access rights to one or more of the sections of the document, so that the user can specify whether updates made by the user to the one or more sections of the document can be displayed to other users, and so that the user can view the names of other users accessing the one or more sections of the document and can selectively obtain updates to the document from those users.

According to another aspect, a method for structured coauthoring of a document comprises: opening a document on a client by a user, the document organized into sections, each section representing a part of the document, the document displaying user access permissions for one or more sections of the document and the document displaying the names of users who are editing one or more of the sections of the document; performing operations on one or more sections of the document, the operations being consistent with the user access permissions granted for the one or more sections of the document; identifying updates to the document that can be shared with other users so that the updates to the document are shared with other users; and identifying one or more users from which document updates to one or more of the sections of the document are to be obtained, the one or more users selected from the names displayed on the document, so that the document updates are obtained from the document server and displayed in the appropriate sections of the document.

According to yet another aspect, a method for coordinating the structured coauthoring of a document at a document server comprises: dividing a document into a plurality of sections, each of the sections including a paragraph of the document; storing user access permissions to each of the sections of the document for a plurality of users of the document, the user access permissions defining an extent to which each of the plurality of users can view, edit and comment on the sections of the document; storing the names of users who are accessing each of the sections of the document; rendering an instance of the document to the users of the document, the rendered document including access controls that indicate user access permissions for each of the sections of the document, the rendered document including the names of the users who are editing each of the sections of the document, the rendered document including action controls providing actions including requesting updates to the sections from the users and designating that updates a user made to the sections are made available to users; storing updates to the document made by the users of the document; receiving a request from a first user to share updates to the document made by the first user with other users; in response to the request from the first user, enabling the document updates made by the first user to be shared with other users; receiving a request from a second user to receive updates to the sections of the document made by other users; and in response to the request from the second user, rendering an instance of the document for the second user that includes the shared updates to the sections requested by the second user, the shared updates being rendered in new document sections located directly above the requested document sections.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description serve to explain the principles of the disclosure.

DETAILED DESCRIPTION

The present application is directed to systems and methods for structured coauthoring of a document.

In examples described herein, a document is organized into sections, and users are assigned specific access permissions to one or more sections of the document. The access permissions define the extent to which a user can view, edit, or comment on a section of the document. Structured coauthoring also permits users to share document updates. A user can make changes to the document and decide which, if any, of these changes are shared with other users. In addition, a user can request to see shared updates to the document made by one or more other users.

Figure 1:
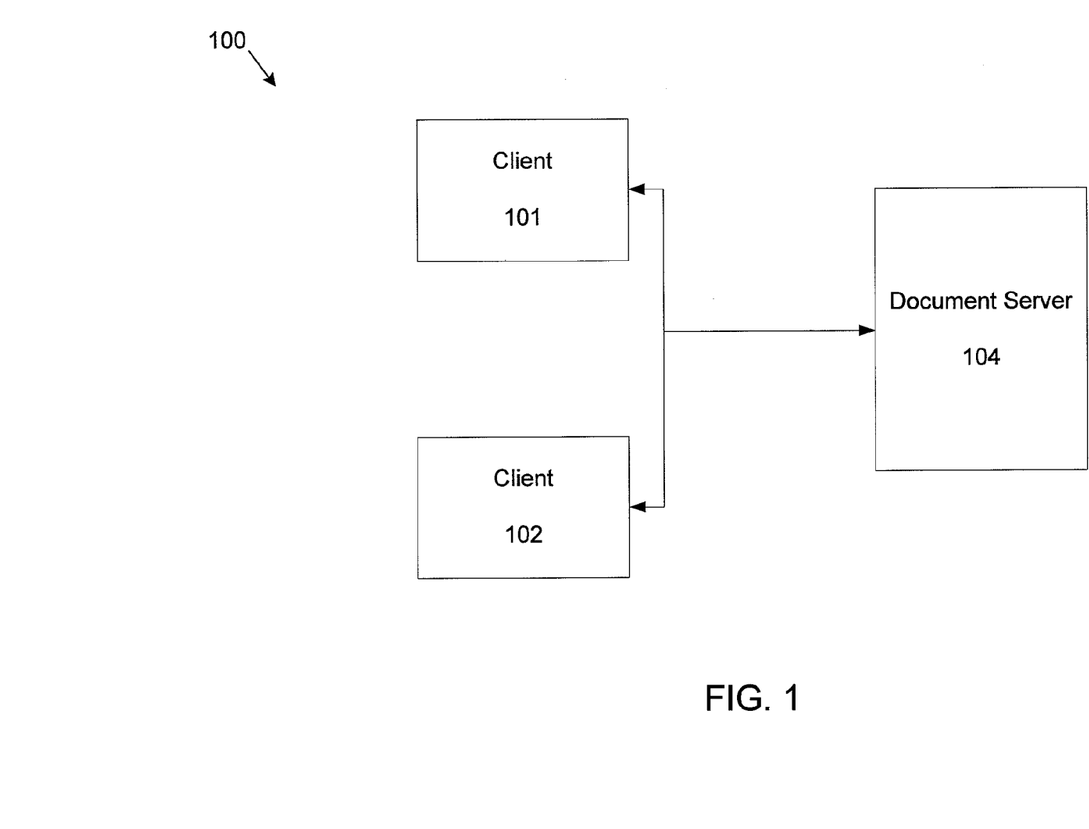
FIG. 1 shows an example system for coauthoring documents.

FIG. 1 shows an example system 100 that supports structured coauthoring of documents. The system 100 includes clients 101, 102 and one or more document servers 104. More or fewer clients and document servers can be used.

In example embodiments, the clients 101, 102 are computing devices, such as desktop computers, laptop computers, personal data assistants, or cellular devices. The clients 101, 102 can include input/output devices, a central processing unit ("CPU"), a data storage device, and a network device.

Typical input/output devices include keyboards, mice, displays, microphones, speakers, disk drives, CD-ROM drives, and flash drives. Other types of input/output devices can also be used.

Computer readable media, such as the data storage device, provides for data retention. By way of example, computer readable media can include computer storage media and communication media. Computer storage media includes physical volatile and nonvolatile, removable and non-removable media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal.

Among the plurality of information stored on the data storage device is a client operating system ("OS") and client applications. The client OS is a program that manages the hardware and software resources of the client system. The client applications utilize the resources of the clients 101, 102 to directly perform tasks specified by the user. For example, the clients 101, 102 include one or more software applications, such as word processing programs, that are used to create and edit document files. One example of such an application is Microsoft Word from Microsoft Corporation of Redmond, Wash. Other examples of such applications are also applicable.

The network device enables the clients 101, 102 to send and receive data to/from the server 104 through a network such as a LAN or the Internet. Other configurations for the clients 101, 102 are possible.

The document server 104 is a file server that is accessible through a network. The document server 104 stores a plurality of files. These files can include both software applications and documents, as described further herein. The document server 104 controls access to the documents stored by the server 104.

In example embodiments, the document server 104 can be located within an organization or can be part of an Internet-based shared document system. An example Internet-based shared document system is a SHAREPOINT® team services portal server services provided by Microsoft Corporation. An example shared document server is Microsoft Office SharePoint Server 2007 provided by Microsoft Corporation. Other configurations can be used.

Figure 2:
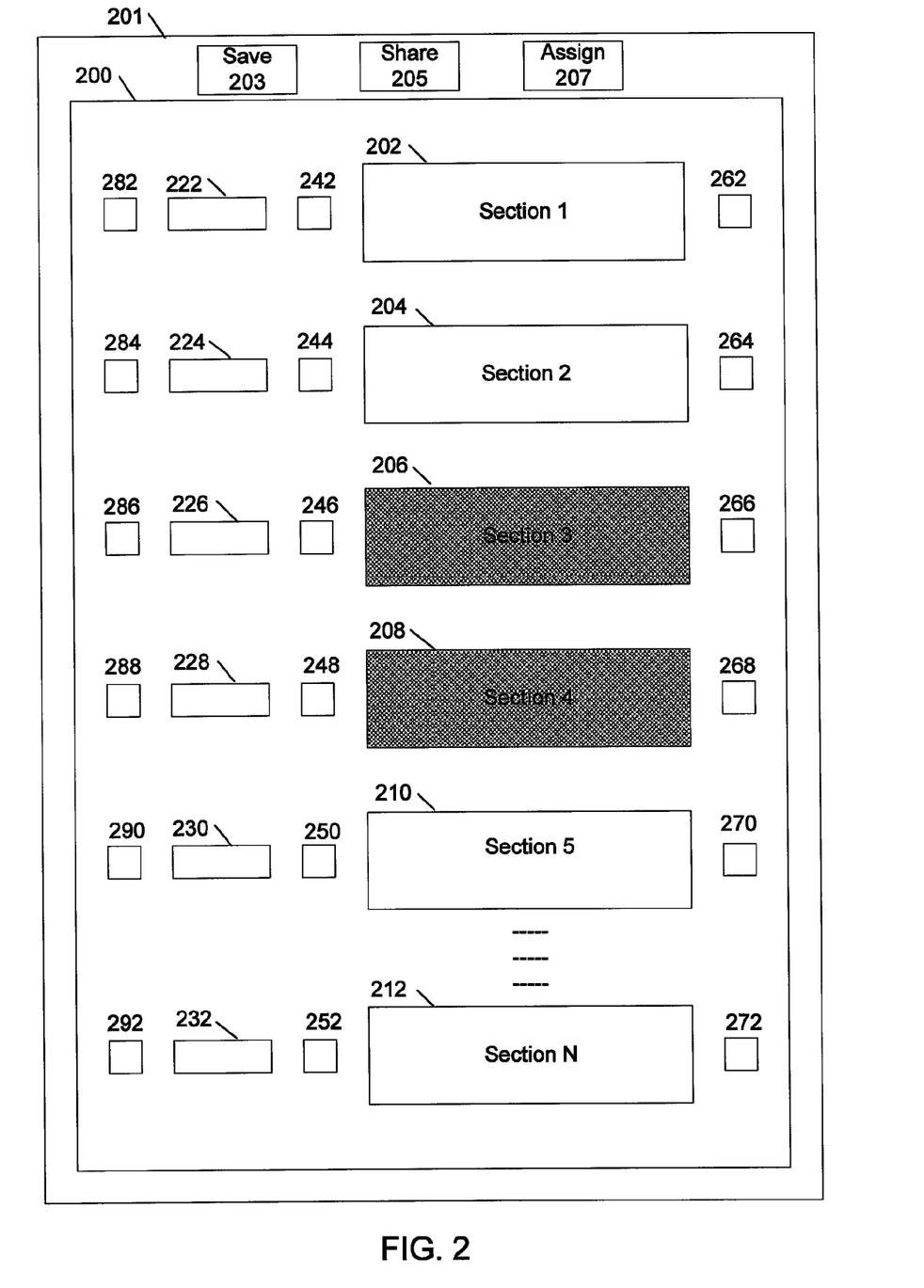
FIG. 2 shows a structure of an example document used for coauthoring.

FIG. 2 shows an example document 200 that is rendered by a word processing application 201 on example client 101.

In the example shown, the document 200 is organized into a plurality of sections, designated as sections 202 through 212, respectively. A section corresponds to an editable piece of a document. Typically, a section can be any subpart of a document, for example paragraphs, headings, drawings, tables, etc. A document may contain only one section, for example a table or a single paragraph or sentence.

Alongside each section of the example document 200 are example user controls 222-232 that display the names of users who are currently coauthoring the section. The example document 200 also includes example access controls 242-252 that display the access permissions of each user for the document section and example action controls 282-292 that permit the user to take one or more specific actions for the document section. The specific actions may include assigning the document section to another user, marking the document section reviewed, marking the document section completed, etc. In addition, the example document 200 also includes example dynamic controls 262-272 that define rules for dynamically changing the access permissions for a section of the document. Other functionality for the controls is possible. The controls may include text boxes, list boxes, pull-down list boxes, icons or any other user interface control types that may be appropriate.

In the example shown, the user controls 222-232 list the names of the user or users who are currently editing the note section 202-212 of the documents. For example, if user A and user B are currently editing section 202 of the document, the names of user A and user B are listed in the user control 222 so that everyone that has the document 200 open can see that user A and user B are currently editing the section 202. A user is considered to be editing a document section when the user makes changes to the document section, for example by typing in the document section.

The access permissions of the access controls 242-252 indicate the extent to which a user may edit a section of the document 200. Example user access permissions include full control, read/write, review only, comment only, read only and no access. Other user access permissions may be possible.

In example embodiments, the names of all users with any level of access permission to the document section are displayed via user controls 222-232. In example embodiments, the names of users with read only access may not be displayed, for example if the list of such users is long.

When a user is assigned full control, the user has full read/write access to the section of the document and, in addition, the user can use any aspect of the user interface. For example, with full control, the user can change the formatting of the document. When a user has read/write control, the user has read-write permission to a section of the document, but cannot make formatting changes. With review only permission, a user can make changes to the document that are tracked via a technology like Track Changes in Microsoft Word. With comment only permission, the user can insert comments to a section of the document but cannot alter the text within the section of the document. With read only permission, the user can view the section of the document but cannot make any changes to it and cannot insert any comments.

With no access permission, certain sections of a document may not be viewable to users. For example, there may be confidential information in a document that one or more users are not permitted to view. Therefore, when presented to a user, one or more sections of a document may be redacted to prevent a user from viewing it. This is illustrated by shaded sections 206 and 208 in FIG. 2, which have been defined as no access for some of the users. In some embodiments, confidential sections may not be displayed at all to a user that is not permitted to view them. In example embodiments, sections of a document may be redacted if a user is not permitted to edit them. For example, in a document that includes both engineering and financial sections, the financial sections may be redacted when an engineer is viewing the document and the engineering sections may be redacted when a financial person is viewing the document.

In example embodiments, user access permissions and rules may be assigned and edited by an owner of the document (i.e. the person or persons having ownership permission for the document). This may be done on a section by section basis or globally for the entire document. The user access permissions and rules are stored on a document server.

The user access permissions described can also be enforced without network connectivity. Assigned user permissions to sections of a document can be cached in the client's software application or stored within the document. In this way, the access permissions can be used if the client is disconnected from the network or working on the document from a different computer.

The action controls 282-292 permit the user to take a specific action regarding the document section. For example, the user may wish to obtain updates to the document section from one or more other users that may be editing the document section or the user may wish to share updates that the user made to the document section with one or more other users. Other example actions that the user may make include sending an email to a user or instant messaging a user to find out status. Other actions are possible.

The dynamic controls 262-272 are used to define rules that permit the access permissions for a section of the document to dynamically change when a user completes a task. For example, one or more users may be designated reviewers, but a user may not want the document to be reviewed until it is completed. In an example embodiment, when a user marks a section of a document as complete, the access permission for a reviewer dynamically changes from read/only to review only.

When a user opens and begins editing the document 200, the user can view the corresponding example coauthoring control 222-232 to determine who else is currently editing the various sections of the document. Typically, the user may know one or more other users and may want to see any changes that the other users have made before the user makes any additional changes. The user can indicate via example action controls 282-292 that the user wants to view the changes of one or more other users, and if those users have designated that their changes can be shared, the changes made by the one or more other users will be displayed on the document shown to the user.

In example embodiments, the user also has the flexibility to decide when to share edits with other users. When editing a document, the user may not want to share changes until those changes are in a state with which the user feels comfortable. In one example embodiment as discussed above, the user selects an example action control 282-292 to specify a user with which changes can be shared. In another example embodiment, when the user wishes to share changes with other users, the first user highlights the section of the document to be shared and clicks example Share button 205 on the user interface. This notifies the document server 104 that changes to the document section document are to be shared. In example embodiments, clicking the example Share button 205 may bring up a list of users with which the document section changes may be shared. Other implementations are possible.

In addition to example Share button 205, the example user interface also includes an example Save button 203 and an example Assign button 207. The example Save button 203 operates as a standard save button, allowing the user to save changes into client or server memory. However, the save operation does not result in sharing updates with others. The example Assign button 207 permits the owner of the document to assign access permissions to other users.

Figure 3:
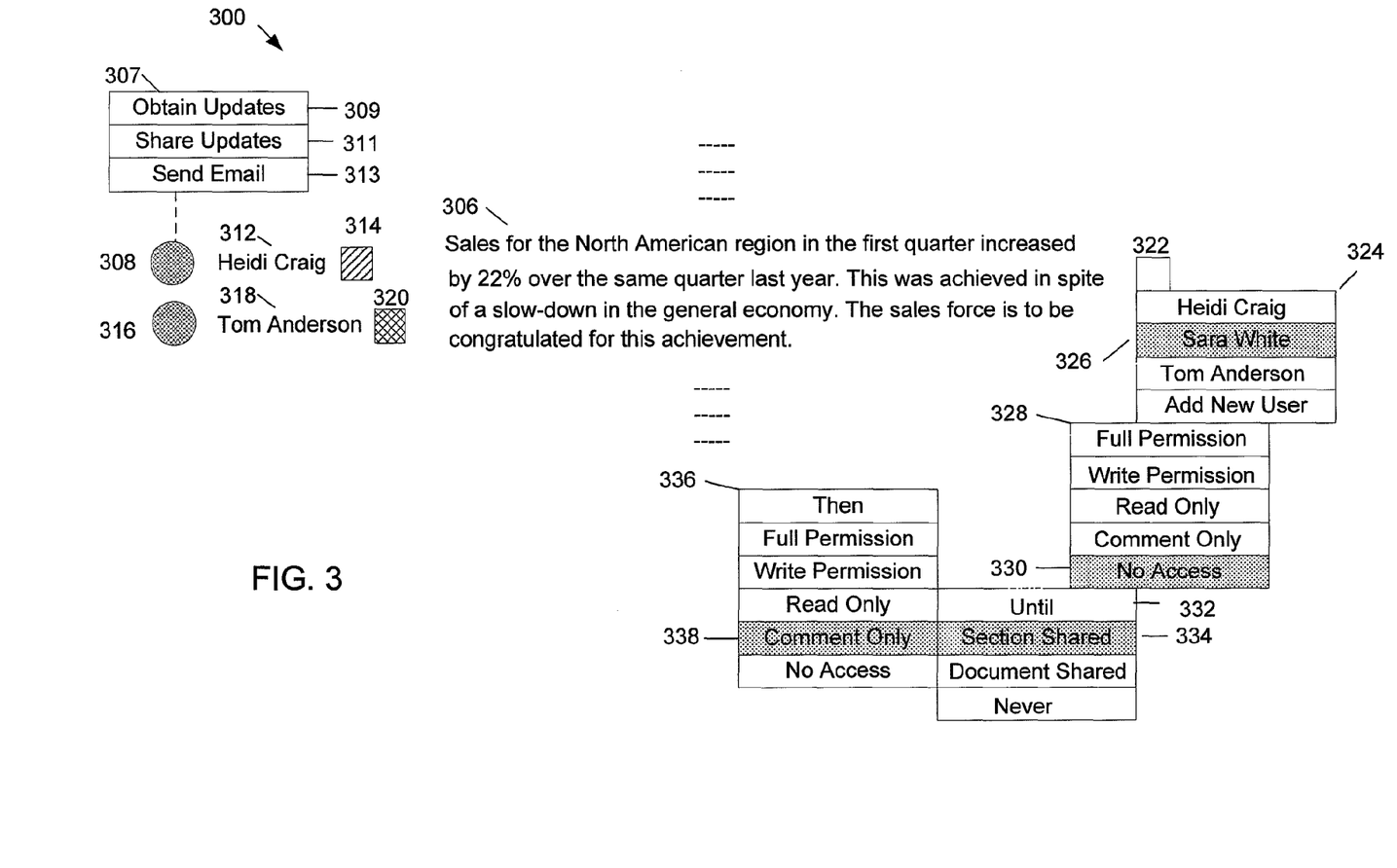
FIG. 3 shows a portion of an example document for coauthoring.

FIG. 3 shows an example embodiment of a document 300 for structured coauthoring of an example document section 306. To the left of the example document section 306 are example user controls 312, 318 displaying the names of two users currently coauthoring the document section. In this example, the two users are Heidi Craig and Tom Anderson. Associated with the users are example access controls 314, 320 and example action controls 308, 316. For user Heidi Craig, the example access control 314 is shaded to indicate full access. For user Tom Anderson, the example access control 320 has a different shading to indicate write access. In other embodiments color, shape of icon, text, etc. may be used to indicate access status.

The example action controls 308, 316 permit the user to select one or more actions to be taken regarding the document section. In an example embodiment, when the user moves a mouse over an action control (for example the action control 308 for Heidi Craig), a list of available actions 307 is presented. In this example embodiment, if the user selects the example action 309 for obtaining updates, the user will obtain updates to the document section from Heidi Craig that Heidi has designated for sharing. If the user selects the example action 311 to share updates, the changes the user made to the document section will be shared with Heidi Craig. If the user selects example action 313, the user can send an email to Heidi Craig. Moving the mouse over the example action control 316 for user Tom Anderson provides the same set of action options for Tom Anderson.

In another embodiment, the action control 308, 316 is a pull-down list box that provides a list of choices for the user. Other embodiments for action controls are possible.

Also shown in FIG. 3 is an example dynamic control 322. The example dynamic control 322 allows the user to dynamically change access permissions to the document section and to specify conditional access permissions. In this example, the dynamic control 322 is a pull-down list box. When expanded, the example dynamic control displays an example list of users 324 that have access permissions for the example document section 306. When one of the example users 324 is selected, the access permission for that user is shown. For example, if example user Sara White 326 is selected, the dynamic control 322 is further expanded to shown example access permission list 328. In example access permission list 328, example access permission 330 (No Access) is shaded, indicating that Sara White currently has no access to this document section. For this example, if access permission 330 is clicked, the dynamic control 322 is further expanded to provide a means to dynamically change access permissions. A list of Until options 332 is displayed, providing the option of maintaining the current access permission until a specific action occurs. For example, the user may select the Section Shared option 334 to specify that the current No Access permission for Sara White is to be maintained until the document section is designated for sharing by the user. When the example Section Shared option 334 is clicked, the dynamic control 332 is further expanded to provide an example list of Then options 336, indicating access permissions that can be set once the Section Shared action occurs. In the example, the Comment Only option 338 is selected, indicating that the access permission for user Sara White will dynamically change from No Access to Comment Only when the document section is designated for sharing.

Figure 4:
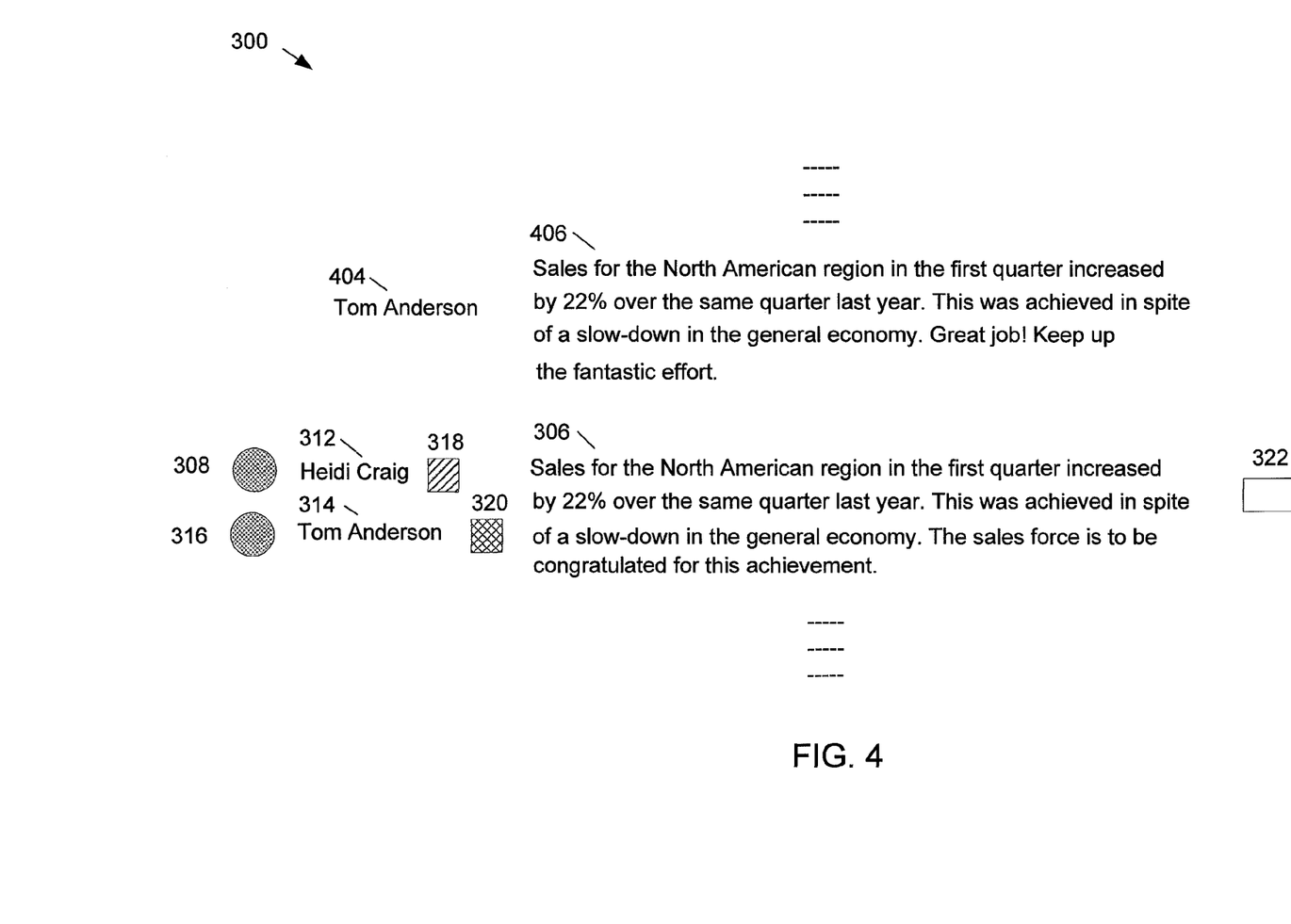
FIG. 4 shows an example of displaying document updates from another user for a portion of the example document shown in FIG. 3.

Referring now to FIG. 4, in an example embodiment, changes may be displayed above the document section so the user may see them before making any additional edits, as shown in the example document 300. In the example document 300, the user, via action control 316, makes a request to receive updates to document section 306 from Tom Anderson. The updates 406 are displayed above document section 306. The user may observe that Tom Anderson changed the last sentence in document section 306 and may make additional changes to the document section as a result.

Other example embodiments for the selection and display of coauthoring changes are possible. For example, the coauthoring changes may be displayed adjacent to the current section, below the current section or simply incorporated into the current section. In example embodiments, deletions and additions may be shown by strikethroughs and underlining.

In example embodiments, the user can select the one or more other users for which changes are to be displayed. The user may also globally select changes from all other users. In example embodiments, the changes can be received on a per section basis or for the entire document.

Figure 5:
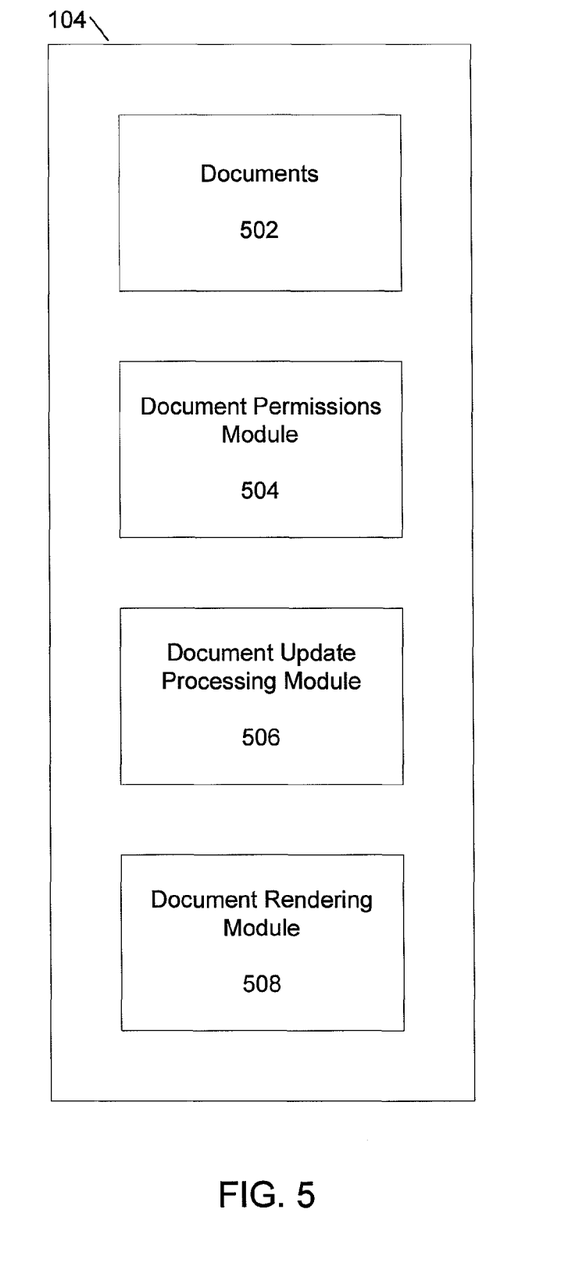
FIG. 5 shows example modules of an example document server.

FIG. 5 shows the example document server 104 in more detail. The example document server 104 includes one or more documents 502, a document permissions module 504, a document update processing module 506, and a document rendering module 508. An example document 502 is rendered to a user when a request is received from an application program on a client to open the document.

The example document permissions module 504 stores the access permissions for each section of each document for each user. In some embodiments, the access permissions are stored within each document. In other embodiments, the access permissions are stored separately from each document (for example on a server or in a database) and are linked to the document. As noted above, different user access permissions can include full control, read/write, review only, comment only, read only and no access. Other user access permissions are possible.

The example document permissions module 504 also enforces access permissions without network connectivity. The document permissions module 504 achieves this enforcement by caching the access permissions on the client. The access permissions are cached for the user and for all other users who have accessed the document. The document permissions module 504 updates the client cache dynamically when the access permissions change. When the user goes offline, the client cache is checked to determine the extent to which the user can edit sections of the document.

The example document update processing module 506 keeps track of all changes saved to a document by users. The document update processing module 506 also keeps track of which of these changes are designated by a user to be shared with other users. Typically, a user saves changes made to a document by clicking a button on the user interface representing saving. However, these saved changes are not made available to other users until a user designates the changes to be shared. In example embodiments, a user can make such a designation by highlighting one or more sections of a document and clicking a button on the user interface representing sharing. In other example embodiments, the user may designate that a document section is to be shared via an action control button adjacent to the document section. The user may also designate that the entire document is to be shared. The use of buttons representing saving and sharing are examples only. Other implementations are possible.

The example document update processing module 506 also processes requests from a user to obtain changes made to the document from other users. The user requests may be made for each document section via an action control or they may be made for the entire document. The example document update processing module 506 determines which sections of the document can be updated and provides the updated changes to the example document rendering module 508. The user requests are manually generated so that the user can be in control of when the document is updated. This prevents the situation where a document section is updated while a user is editing it, possibly overriding changes the user made.

The example document rendering module 508 renders the document for display to a user on a client. The document rendering module may use standard user interface controls such as text boxes, list boxes and pull-down list boxes to display user access permissions for each section of the document and to display the names of users accessing sections of the document. In alternate embodiments custom designed controls may be used. User interface controls may also be used to define rules for each section of the document that are used to dynamically change access permissions depending on the user operation being performed.

The example document rendering module 508 also incorporates any shared updates from users into the document. These are updates made by users that were saved at the document server 104 and designated to be shared with other users. The updates may include edited changes to sections of the document, tracked review changes or comments. The example document rendering module 508 typically renders text edits above the section of the document in which the edits were made so that the current user can easily see them. Comments are typically rendered adjacent to sections of the document. However, in example embodiments, the updates may be positioned differently.

Figure 6:
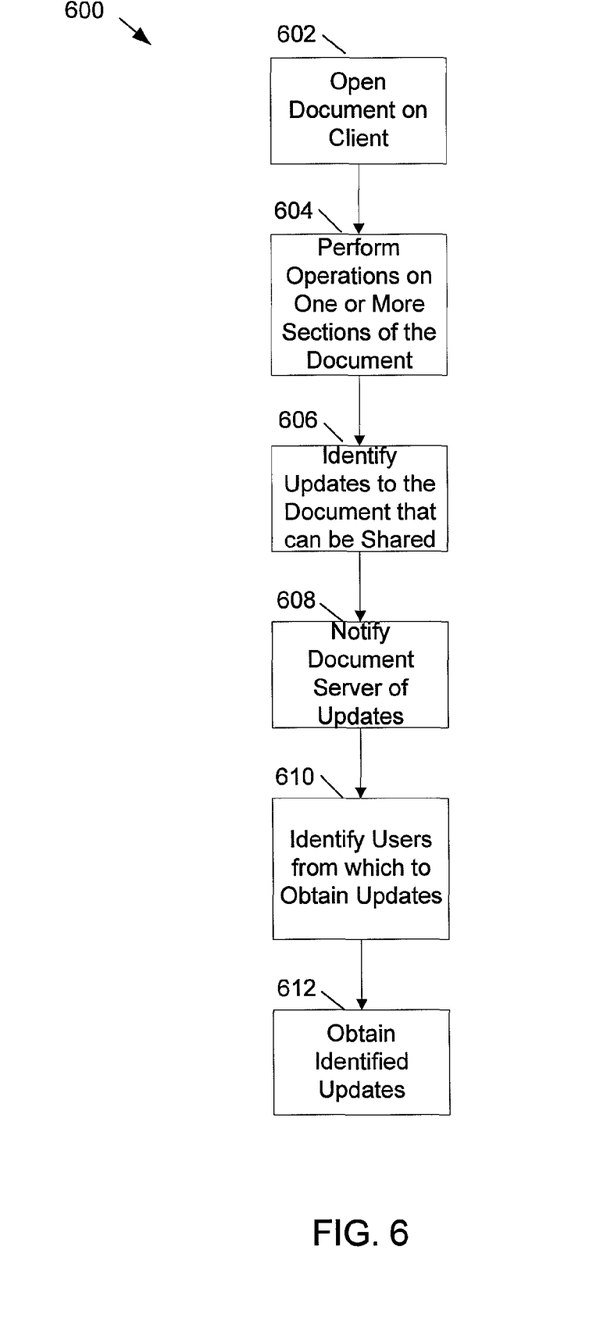
FIG. 6 shows a flowchart for an example method for coauthoring a document.

FIG. 6 shows an example flowchart for a method 600 for coauthoring a document. At operation 602, a user opens a document on a client. The document, obtained from a document server, is organized into sections. Access permissions for the user are displayed on one or more sections of the document. In addition, the names of other users are displayed on the document, typically adjacent to the sections of the document they are accessing.

At operation 604, the user performs operations consistent with the access permissions for a section. For example, if the user has full control for a section, the user can make full edits to a section of a document, including changing formatting for the section. By contrast, if a the user has comment only access, the user can only insert comments for a section of the document but can not edit any text in the section.

When the user has completed the operation appropriate to the access permission for a section, the user may wish to share the changes made to one or more sections of the document with other users. At operation 606, the user identifies the updates to the document that can be shared. For example, the user may highlight the sections that can be shared. In another example, the user can choose to share all updates.

At operation 608, the user notifies the document server that the identified updates are available for sharing. This can be done, for example, by clicking a button on the user interface representing sharing. As another example, the user may click a button indicating that all changes made to the document are to be shared. Other ways to designate sections to be shared and to notify the document server are possible.

As the user is editing the document, the names of other users who are also editing the document are displayed for each section of the document. If the user wishes to view the edits from one or more other users, the user identifies the one or more other users at operation 610. For example, the user may highlight the name of another user or double click on the name of another user. Other implementation methods are possible.

At operation 612, the updates from the identified other users are obtained and displayed on the document. The updates are typically displayed above the section the user is editing along with the name of the other user. Other implementations are possible.

Figure 7:
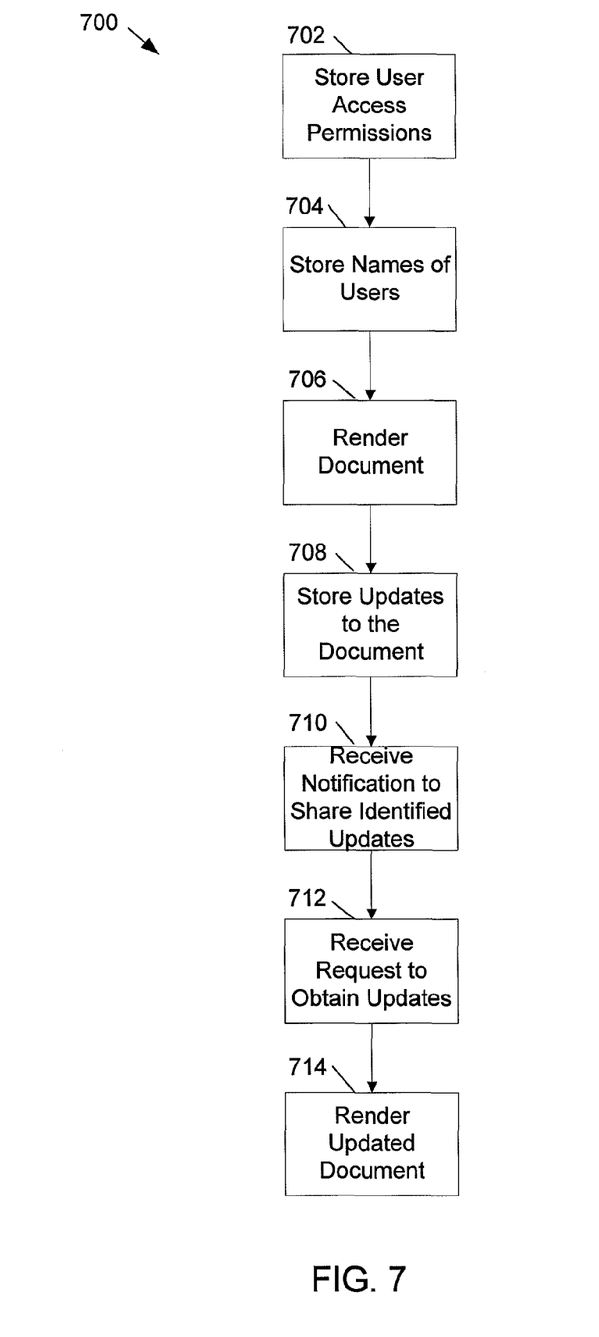
FIG. 7 shows a flowchart for an example method for coordinating the coauthoring of documents at a document server.

FIG. 7 shows an example flowchart for a method 700 for coordinating the coauthoring of a document at a document server. At operation 702, the user access permissions for each section of a document that are stored in the document server. At operation 704, the names of users currently coauthoring the document are stored at the document server.

At operation 706, the contents of the document, the user access permissions for each section of the document and the names of users coauthoring sections of the document are used to render the document for display to a user on a client. The user access permissions and the names of users coauthoring sections of the document are typically displayed using standard user interface controls such as text boxes, list boxes or pull-down list boxes. Other implementations are possible.

As users make changes to the document, those changes are stored in the document server at operation 708. However, the changes are not available for sharing until designated as such by a user who made the changes.

When a user determines that changes to the document are available for sharing, at operation 710 the document server receives a notification from the client that identifies the updates to be shared and to make those updates available to other users who may request them.

At operation 712, the document server receives a request from a user for updates to the document made by one or more other users. The document is then rendered at operation 714 to incorporate the shared changes requested.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method executable on a computer system for co-authoring a document by a plurality of users, the computer system having at least one data storage device communicatively coupled to at least one processing unit, the method comprising:
   accessing the document, wherein the document is organized into a plurality of sections;
   receiving first user access permissions associated with a first section of the plurality of sections of the document, wherein the first user access permissions define an extent to which a first user of the plurality of users can access a first section of the plurality of sections of the document;
   receiving second user access permissions associated with the first section of the document, wherein the second user access permissions define an extent to which a second user of the plurality of users can access the first section of the document;
   displaying a dynamic control adjacent to each section of the document, wherein the dynamic control for a given section is selectable for setting one or more customized rules for dynamically changing one or more user access permissions associated with the given section of the document;
   in response to a selection of the dynamic control adjacent to the first section, setting customized rules for dynamically changing the second user access permissions for the first section upon satisfaction of a condition;
   receiving first updates to the first section of the document, wherein the first updates are made to the first section according to the first user access permissions;
   receiving a request from the first user to share the first updates with the second user, wherein the second user is specifically selected from the plurality of users;
   receiving second updates to the first section of the document, wherein the second updates are made to the first section according to the second user access permissions;
   receiving a request from the second user to share the second updates with a third user, wherein the third user is specifically selected from the plurality of users;
   displaying a first user control indicating that the first user is accessing the first section of the document;
   displaying a second user control indicating that the second user is accessing the first section of the document;
   determining that the condition has been satisfied; and
   in response to the determination, dynamically changing the second user access permissions for the first section in accordance with the one or more customized rules.

2. The method according to claim 1, wherein the first user access permissions and the second user access permissions include a level of access selected from the group consisting of: full control, read/write, review only, comment only, read only, and no access.

3. The method according to claim 1, further comprising:
   receiving a request from the first user to receive the second updates; and
   only displaying the second updates when a request to share the second updates with the first user was received.

4. The method according to claim 1, further comprising:
   receiving changes to the first user access permissions associated with the first section of the document, wherein the changed first user access permissions define a different extent to which the first user can access the first section of the document.

5. The method according to claim 1, wherein after the first updates are received to the first section of the document, the first updates are not available to the second user until the first user sends a request to share the first updates with the second user.

6. The method according to claim 1, further comprising:
   receiving a request from the second user to receive the first updates;
   determining that the request to share the first updates with the second user was received; and
   displaying the first updates.

7. The method according to claim 1, wherein the first user access control dynamically changes from an access level of "no access" to an access level of "review only" after the second user performs an action that satisfies a second condition, wherein the action comprises marking a section of the document as complete.

8. A computer system for co-authoring a document by a plurality of users comprising:
   at least one processing unit; and
   at least one data storage device, communicatively coupled to the at least one processing unit and containing computer-readable instructions that are executed by the at least one processing unit to perform the following steps:
   displaying the document, wherein the document is organized into a plurality of sections;

receiving first user access permissions, wherein the first user access permissions define an extent to which a first user of the plurality of users can access a first section of the plurality of sections of the document;

displaying a first access control adjacent to a first user control, wherein the first access control identifies the first user access permissions;

receiving second user access permissions, wherein the second user access permissions define an extent to which a second user of the plurality of users can access a first section of the plurality of sections of the document;

displaying a second access control adjacent to a second user control, wherein the second access control identifies the second user access permissions, wherein the first user access permissions and the first access control are different from the second user access permissions and the second access control;

displaying a dynamic control adjacent to each section of the document, wherein the dynamic control for a given section is selectable for setting one or more customized rules for dynamically changing one or more user access permissions associated with the given section of the document;

in response to a selection of the dynamic control adjacent to the first section, setting customized rules for dynamically changing the second user access permissions for the first section upon satisfaction of a condition;

receiving first updates to the first section of the document, wherein the first updates are made to the first section according to the first user access permissions;

receiving a request from the first user to share the first updates with the second user, wherein the second user is specifically selected from the plurality of users;

receiving second updates to the first section of the document, wherein the second updates are made to the first section according to the second user access permissions;

receiving a request from the second user to share the second updates with a third user, wherein the third user is specifically selected from the plurality of users;

displaying the first user control indicating that the first user is accessing the first section of the document;

displaying the second user control indicating that the second user is accessing the first section of the document;

determining that the condition has been satisfied; and in response to the determination, dynamically changing the second user access permissions for the first section in accordance with the one or more customized rules.

9. The computer system according to claim 8, wherein the first user access permissions and the second user access permissions include a level of access selected from the group consisting of: full control, read/write, review only, comment only, read only, and no access.

10. The computer system according to claim 8, wherein the first user access permissions include a level of access that dynamically changes to another level of access when a condition is satisfied.

11. The computer system according to claim 10, wherein the condition is completion of a task.

12. The computer system according to claim 8, wherein the first user control is the name of the first user and the second user control is the name of the second user.

13. The computer system according to claim 8, wherein the first access control and the second access control are represented as icons, and wherein different access permissions are represented by one of: different colored icons, different shaded icons, and different shaped icons.

14. The computer system according to claim 8, further comprising:

receiving a request from the second user to receive the first updates;

determining that the request to share the first updates with the second user was received; and displaying the first updates.

15. A computer storage medium, not consisting of a modulated data signal, and encoding computer executable instructions that when executed by a processing unit perform a method for co-authoring a document by a plurality of users, the method comprising:

accessing the document, wherein the document is organized into a plurality of sections;

receiving first user access permissions associated with a first section of the plurality of sections of the document, wherein the first user access permissions define an extent to which a first user of the plurality of users can access the first section of the document;

receiving second user access permissions associated with the first section of the document, wherein the second user access permissions define an extent to which a second user of the plurality of users can access the first section of the document, and wherein the second user access permissions are different from the first user access permissions;

displaying a dynamic control adjacent to each section of the document, wherein the dynamic control for a given section is selectable for setting one or more customized rules for dynamically changing one or more user access permissions associated with the given section of the document;

in response to a selection of the dynamic control adjacent to the first section, setting customized rules for dynamically changing the second user access permissions for the first section upon satisfaction of a condition;

receiving first updates to the first section of the document, wherein the first updates are made to the first section according to the first user access permissions;

receiving a request from the first user to share the first updates with the second user, wherein the second user is specifically selected from the plurality of users;

receiving second updates to the first section of the document, wherein the second updates are made to the first section according to the second user access permissions;

receiving a request from the second user to share the second updates with the third user, wherein the third user is specifically selected from the plurality of users;

displaying a first user control indicating that the first user is accessing the first section of the document;

displaying a first user access control indicating the first user access permissions adjacent to the first user control;

displaying a second user control indicating that the second user is accessing the first section of the document; displaying a second user access control indicating the second user access permissions adjacent to the second user control;

determining that the condition is satisfied; and in response to the determination, dynamically changing the second user access permissions for the first section in accordance with the one or more customized rules.

16. The computer storage medium according to claim 15, wherein the first user access permissions and the second user access permissions include a level of access selected from the group consisting of: full control, read/write, review only, comment only, read only, and no access.

17. The computer storage medium according to claim 15, further comprising:
   storing fourth user access permissions associated with the first section of the document, wherein the fourth user access permissions define an extent to which a fourth user can access the first section of the document, and wherein the fourth user access permissions include a level of no access; and
   redacting the first section of the document from viewing by the fourth user.

18. The computer storage medium according to claim 15, further comprising:
   receiving a request to change the first user access permissions associated with the first section of the document, wherein the changed first user access permissions define a different extent to which the first user can access the first section of the document.

19. The computer storage medium according to claim 15, wherein after the first updates are received to the first section of the document, the first updates are not available to the second user until the first user sends a request to share the first updates with the second user.

20. The computer storage medium according to claim 15, further comprising:
   receiving a request from the second user to receive the first updates;
   determining that the request to share the first updates with the second user was received; and
   displaying the first updates adjacent to the first section of the document.

* * * * *